US012561988B2

(12) United States Patent
Zhou et al.

(10) Patent No.: US 12,561,988 B2
(45) Date of Patent: Feb. 24, 2026

(54) METHOD AND APPARATUS FOR DETERMINING LANE LEVEL LOCALIZATION OF A VEHICLE WITH GLOBAL COORDINATES

(71) Applicant: Atieva, Inc., Newark, CA (US)

(72) Inventors: Tony Zhou, Newark, CA (US); Huan Fu, Newark, CA (US); Fei Zhu, Newark, CA (US); Yi Shi, Newark, CA (US); Mohannad Murad, Newark, CA (US); Eugene Lee, Newark, CA (US)

(73) Assignee: ATIEVA, INC., Newark, CA (US)

( * ) Notice: Subject to any disclaimer, the term of this patent is extended or adjusted under 35 U.S.C. 154(b) by 0 days.

(21) Appl. No.: 18/612,682

(22) Filed: Mar. 21, 2024

(65) Prior Publication Data

US 2025/0299499 A1    Sep. 25, 2025

(51) Int. Cl.
*G06V 20/56* (2022.01)
*G01C 21/00* (2006.01)
(Continued)

(52) U.S. Cl.
CPC ........... *G06V 20/588* (2022.01); *G01C 21/16* (2013.01); *G01C 21/3822* (2020.08); *G06T 7/64* (2017.01)

(58) Field of Classification Search
CPC ...... G06V 20/588; G01C 21/16; G01C 21/38; G01C 21/3815; G01C 21/3822; G06T 7/64; G06T 7/66; G06T 7/60; G06T 7/70; B60W 40/072; B60W 30/045; B60W 30/06; B60W 30/08; B60W 30/095; B60W 30/0953;
(Continued)

(56) References Cited

U.S. PATENT DOCUMENTS

2010/0082238 A1* 4/2010 Nakamura ............. G01C 21/32
                                                            701/532
2017/0010618 A1* 1/2017 Shashua ............... G05D 1/0246
(Continued)

FOREIGN PATENT DOCUMENTS

EP            4148388 A1 * 3/2023    ............ B60W 30/12

OTHER PUBLICATIONS

International search Report and written opinion received for PCT application No. PCT/US2025/019618, mailed on May 19, 2025, 14 pages.

*Primary Examiner* — Nathnael Aynalem
(74) *Attorney, Agent, or Firm* — Womble Bond Dickinson (US) LLP

(57) ABSTRACT

Embodiments relate to a method and apparatus for determining lane level localization of a vehicle with global coordinates. An automotive vehicle includes a vehicle navigation system, a database comprising standard-definition map data corresponding to road level latitude and longitude coordinates for a plurality of roadway features, at least one image sensor, and a processor in communication with the vehicle navigation system, the database, and the at least one image sensor. The processor is configured to determine an initial location of the vehicle, estimate a current location of the vehicle based on a dead reckoning process, detect, based on image data from the at least one image sensor, a lateral position of the vehicle within a lane of a road, and update the current location of the vehicle based on a difference between the estimated current location and the lateral position of the vehicle within the lane.

26 Claims, 8 Drawing Sheets

(51) Int. Cl.
  *G01C 21/16* (2006.01)
  *G06T 7/64* (2017.01)
(58) Field of Classification Search
  CPC .. B60W 30/0956; B60W 30/10; B60W 30/12;
      B60W 2720/24; B60W 2556/50; B60W
      2520/06; B60W 2520/10; B60W 2520/12;
      B60W 2520/125; B60W 2520/14; B60W
          2520/16; G05D 1/0212
  USPC ......................................................... 348/148
  See application file for complete search history.

(56) References Cited

U.S. PATENT DOCUMENTS

| | | | |
|---|---|---|---|
| 2020/0047752 A1* | 2/2020 | Ivanovic | ............. B60W 40/072 |
| 2020/0240806 A1* | 7/2020 | Daikoku | ................ G08G 1/167 |
| 2020/0393571 A1* | 12/2020 | Park | ...................... B60W 40/10 |
| 2021/0063162 A1 | 3/2021 | Moskowitz et al. | |
| 2022/0097714 A1 | 3/2022 | Reshef et al. | |
| 2022/0176989 A1 | 6/2022 | Hwang et al. | |
| 2022/0306102 A1 | 9/2022 | Kudo | |
| 2023/0147535 A1 | 5/2023 | Tomohito | |
| 2023/0408294 A1* | 12/2023 | Anderson | .......... G01C 21/3807 |

* cited by examiner

101

128

Wireless Transceiver
172

Processor
130

IMU
118

Map Database
160

GPS
120

Memory
110

Wheel Speed Sensors
116

User Interface
170

Image Sensor
121

Navigation System
130

Image Sensor
122

Image Sensor
126

125

250

$f_{right}(y) = A_{right}y^2 + B_{right}y + C_{right}$

210b

432

$f_{left}(y) = A_{left}y^2 + B_{left}y + C_{left}$

210a

X
232

$Y_R$
230b

212

$Y_L$
230a

200

400

500

250

210b

210a

200

540e

545d

540d

545c

540c

545b

540b

545a

540a
X0, Y0

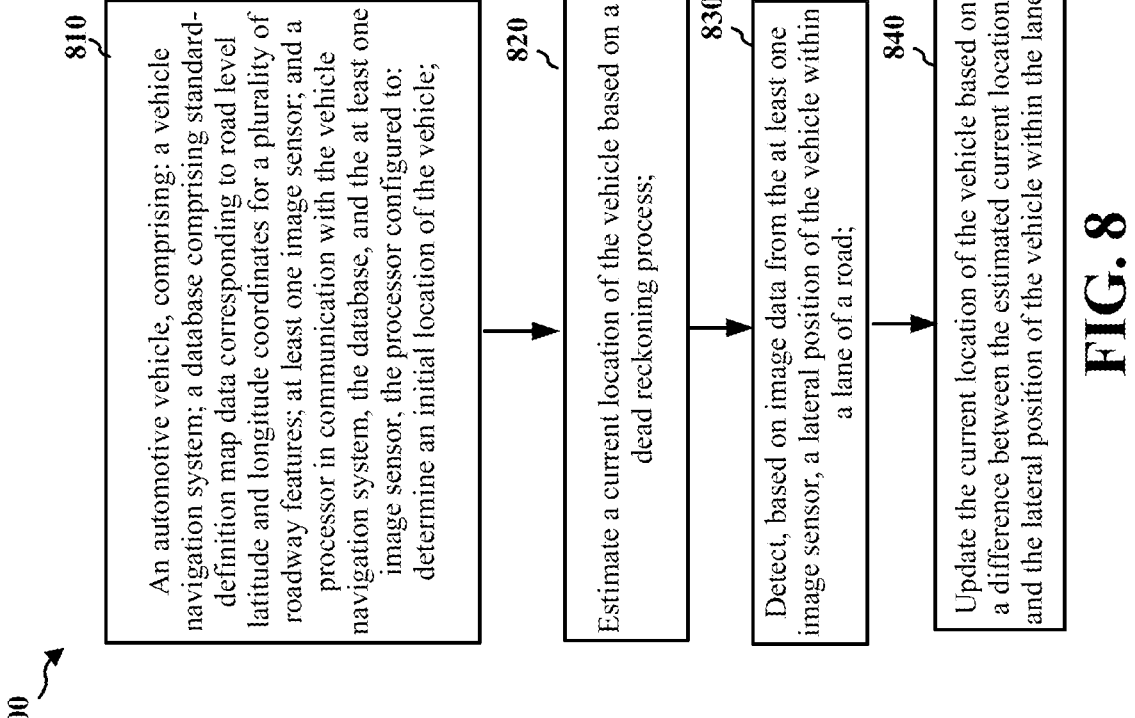

800

810

An automotive vehicle, comprising: a vehicle navigation system; a database comprising standard-definition map data corresponding to road level latitude and longitude coordinates for a plurality of roadway features; at least one image sensor; and a processor in communication with the vehicle navigation system, the database, and the at least one image sensor, the processor configured to: determine an initial location of the vehicle;

820

Estimate a current location of the vehicle based on a dead reckoning process;

830

Detect, based on image data from the at least one image sensor, a lateral position of the vehicle within a lane of a road;

840

Update the current location of the vehicle based on a difference between the estimated current location and the lateral position of the vehicle within the lane

FIG. 8

METHOD AND APPARATUS FOR DETERMINING LANE LEVEL LOCALIZATION OF A VEHICLE WITH GLOBAL COORDINATES

FIELD

Embodiments disclosed herein relate generally to a vehicle, and more particularly, to a method and apparatus for determining lane level localization of the vehicle with global coordinates.

BACKGROUND

Global Navigation Satellite Systems (GNSS) such as Global Positioning System (GPS) technology is widely used as a means for locating an automobile vehicle upon a roadway. As autonomous and semi-autonomous vehicles become more advanced, accurately knowing the vehicle's position in a lane of the roadway becomes critical. However, GPS technology may be inaccurate (due to a weak signal) or unavailable in urban areas due to the GPS signal being blocked by objects or buildings. Achieving an assisted or fully autonomous self-driving vehicle requires a system to determine the vehicle's lateral position within a lane of the roadway with precision even in the absence of a GPS signal. Additionally, advanced driver-assistance systems (ADAS) benefit greatly from this ability. For example, lane keeping assistance (LKA) systems, lane departure warning (LDW) systems, and lane change assistance systems are benefited by accurately knowing the vehicle's lateral position within the lane.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

Embodiments of the present disclosure includes an automotive vehicle comprising a vehicle navigation system, a database comprising standard-definition map data corresponding to road level latitude and longitude coordinates for a plurality of roadway features, at least one image sensor, and a processor in communication with the vehicle navigation system, the database, and the at least one image sensor. The processor is configured to determine an initial location of the vehicle, estimate a current location of the vehicle based on a dead reckoning process, detect, based on image data from the at least one image sensor, a lateral position of the vehicle within a lane of a road, and update the current location of the vehicle based on a difference between the estimated current location and the lateral position of the vehicle within the lane.

Embodiments of the present disclosure includes a method for updating a location of a vehicle navigating a road. The method comprises storing a database comprising standard-definition map data corresponding to road level latitude and longitude coordinates for a plurality of roadway features, determining an initial location of the vehicle, estimating a current location of the vehicle based on a dead reckoning process, detecting, based on image data from at least one image sensor, a lateral position of the vehicle within a lane of the road, and updating the current location of the vehicle based on a difference between the estimated current location and the lateral position of the vehicle within the lane.

Benefits of the present disclosure include lane-level localization for urban, rural, and freeway scenarios on roads, both with and without a high-definition map, and in scenarios with no GNSS/GPS or weak GNSS/GPS signals. Benefits of the present disclosure further include a cost-effective solution for autonomous driving vehicles in urban and rural driving scenarios without relying on a high-definition map.

BRIEF DESCRIPTION OF THE DRAWINGS

The present invention is illustrated by way of example and not limitation in the figures of the accompanying drawings in which like references indicate similar elements.

FIG. 8 is a flowchart of a method for determining lane level localization of the vehicle with global coordinates according to some embodiments of the disclosure.

DETAILED DESCRIPTION

Figure 1:
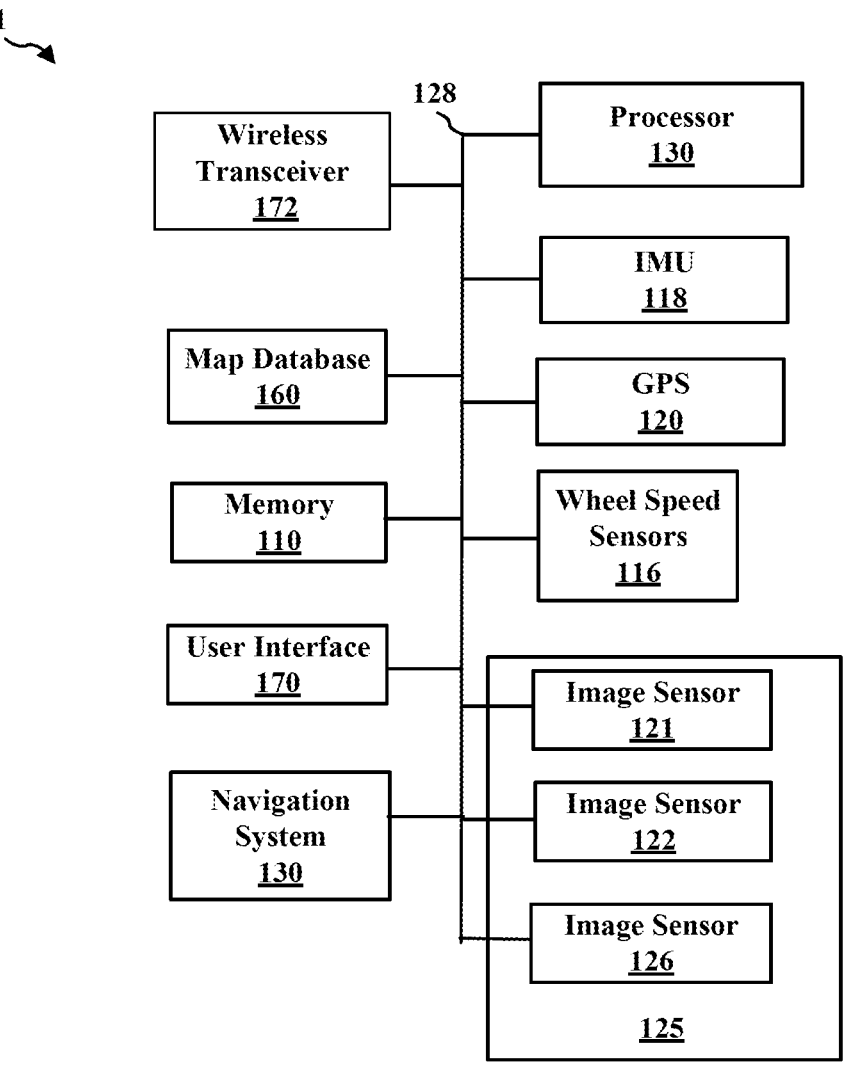
FIG. 1 illustrates system level diagram of a navigation system of a vehicle according to some embodiments of the disclosure.

In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "some embodiments" or "an embodiment" or "example" or "implementation" means that a particular feature, structure, or characteristic described in connection with the embodiment can be included in at least some embodiments of the invention. The appearances of the phrase "in some embodiments" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., a processor, circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

As used herein, the singular forms "a", "an" and "the" are intended to include the plural forms as well, unless the context clearly indicates otherwise. The terms "comprises", "comprising", "includes", and/or "including", as used herein, specify the presence of stated features, process steps, operations, elements, and/or components, but do not preclude the presence or addition of one or more other features, process steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps, calculations, or components, these steps, calculations, or components should not be limited by these terms, rather these terms are only used to distinguish one step, calculation, or component from another. For example, a first calculation could be termed a second calculation, and, similarly, a first step could be termed a second step, and, similarly, a first component could be termed a second component, without departing from the scope of this disclosure. The terms "electric vehicle" and "EV" may be used interchangeably and refer to an all-electric vehicle. The terms "location" and "position" may be used interchangeably.

FIG. 1 is a high-level view of some embodiments of a system controller 101 within a vehicle. The vehicle can be an electric vehicle (EV), a vehicle utilizing an internal combustion engine (ICE), or a hybrid vehicle, where a hybrid vehicle utilizes multiple sources of propulsion including an electric drive system. The vehicle includes a system controller 101, which is comprised of a processor 130 (e.g., a central processing unit (CPU)). System controller 101 also includes memory 110, with memory 110 being comprised of EPROM, EEPROM, flash memory, RAM, solid state drive, hard disk drive, or any other type of memory or combination of memory types. A user interface 170 is coupled to system controller 101. User interface 170 allows the driver, or a passenger, to interact with the system controller 101, for example inputting data into the navigation system 130, altering the heating, ventilation and air conditioning (HVAC) system via the thermal management system, controlling the vehicle's entertainment system (e.g., radio, CD/DVD player, etc.), adjusting vehicle settings (e.g., seat positions, light controls, etc.), and/or otherwise altering the functionality of the vehicle. In at least some embodiments, user interface 170 also includes means for the vehicle management system to provide information to the driver and/or passenger, information such as a navigation map database 160 or driving instructions (e.g., via the navigation system 130 and/or GPS 120) as well as the operating performance of any of a variety of vehicle systems (e.g., battery pack charge level for an EV, fuel level for an ICE-based or hybrid vehicle, selected gear, current entertainment system settings such as volume level and selected track information, external light settings, current vehicle speed (e.g., via wheel speed sensors 116), current HVAC settings such as cabin temperature and/or fan settings, etc.) via the thermal management system. User interface 170 can also be used to warn the driver of a vehicle condition (e.g., low battery charge level or low fuel level) and/or communicate an operating system malfunction (battery system not charging properly, low oil pressure for an ICE-based vehicle, low tire air pressure, etc.).

System controller 101 can use data received from an external on-line source that is coupled to the controller via wireless transceiver 172 (using, for example, GSM, EDGE, UMTS, CDMA, WiFi, LTE, 5G, 6G, etc.). For example, in some embodiments, system controller 101 can receive position information via wireless transceiver 172 based on triangulation of wireless signals from multiple base stations. In some embodiments, system controller 101 can receive updated maps via wireless transceiver 172 for storing in map database 160.

System controller 101 can include an inertial measurement unit (IMU) 118, which can be an electronic device that measures and reports a vehicle's specific force and angular rate (e.g., yaw) using a combination of accelerometers and gyroscopes. The system controller 101 can use data from the IMU 118 to estimate the vehicles position in the road using a dead reckoning process. For example, the system controller 101 can use data from the IMU 118 when position data from the GPS 120 is unavailable.

System controller 101 can include an image acquisition unit 125. In some embodiments, image acquisition unit 125 can include one or more image sensors (e.g., cameras) located at various positions on the vehicle (e.g., left side, right side, front, and/or rear), such as image sensor 121, image sensor 122, and image sensor 126. System controller 101 can also include a data interface bus 128 communicatively connecting processor 130 to the image acquisition unit 125 and the other above reference devices.

Figure 2:
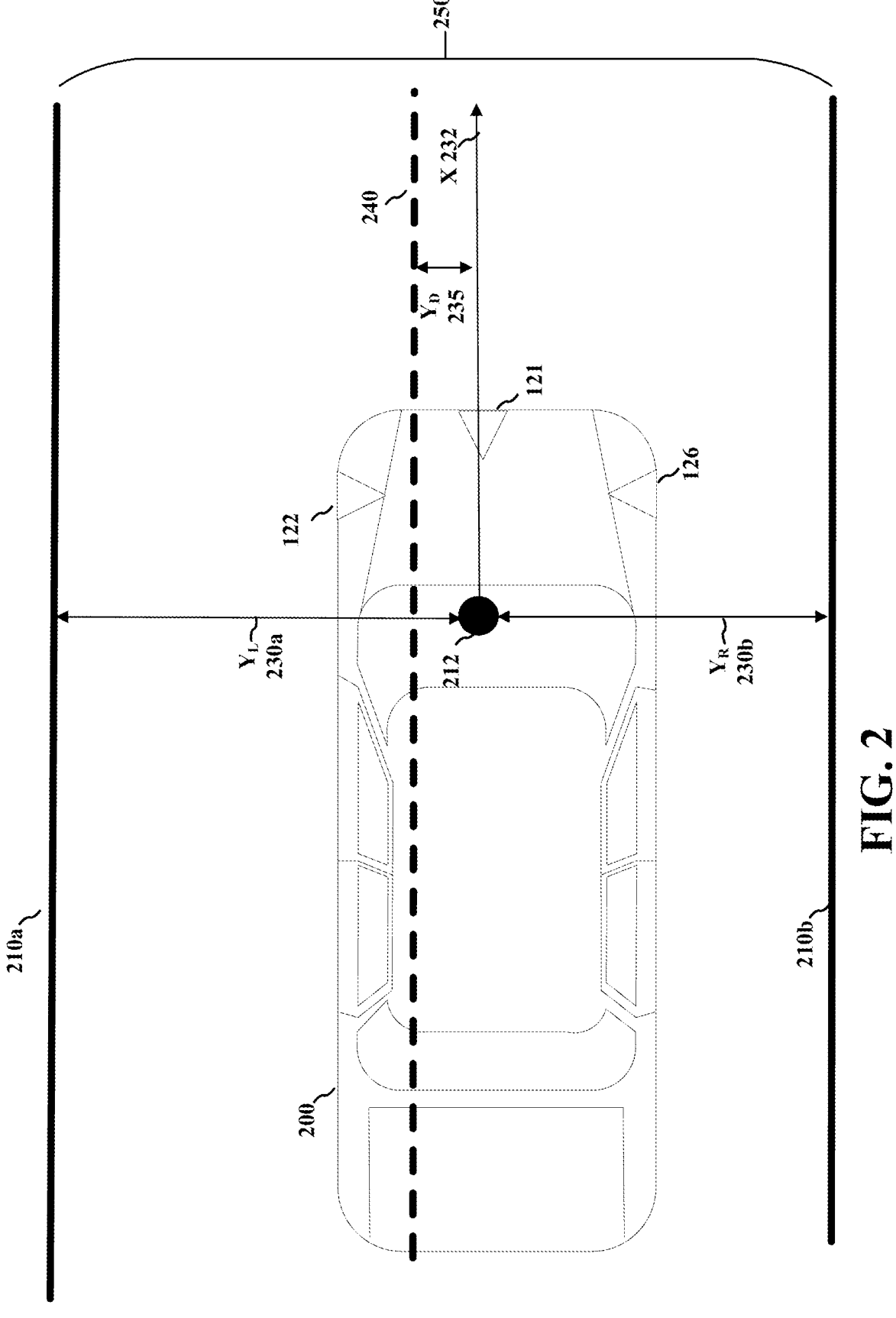
FIG. 2 illustrates a top view of a lateral position of a vehicle within a lane according to some embodiments of the disclosure.

FIG. 2 illustrates a top view of a lateral position of a vehicle 200 (e.g., an ego vehicle) within a lane 250 according to some embodiments of the disclosure. In some aspects, vehicle 200 can travel in lane 250 of a road. The road can include multiple lanes 250. Vehicle 200 can travel within lane 250 in the X 232 direction. In some aspects, vehicle 200 can not travel within the center 240 of the lane 250, the vehicle can travel at a distance $Y_D$ 235 from the center 240 of the lane. For example, vehicle 200 can travel at a lateral distance $Y_L$ 230a from the left lane marker 210a to the center of gravity 212 of the vehicle and a lateral distance Yr 230b from the right lane marker 210b to the center of gravity 212 of the vehicle.

In some aspects, a vehicle navigation system 130 (e.g., an advanced driver-assistance system or autonomous driving system) can control or assist the vehicle in traveling in the center 240 of the lane 250. However, the vehicle navigation system 130 can be unaware of the actual center 240 of the lane 250. For example, the GPS 120 may have a drift error or the GPS signal may be weak or lost. In some aspects, the map database 160 can include a map (e.g., a standard-definition (SD) map such as a Society of Automotive Engineers (SAE) advanced driver-assistance systems (ADAS) level two map) that does not include lane level coordinates. For example, the SD map can only include lane level coordinates for highways/freeways and not include lane level coordinates for urban or rural roads.

Aspects of the present disclosure include determining an initial location of the vehicle 200. For example, the system controller 101 can receive an initial location of the vehicle from the GPS 120. The system controller 101 can subsequently receive an indication from the GPS 120 that the GPS signal is lost or weak (e.g., when the vehicle 200 is traveling in an urban environment). After losing the GPS signal, the system controller 101 can begin estimating the current location of the vehicle based on a dead reckoning process. For example, the system controller 101 can receive, from the IMU 118, a yaw rate associated with the vehicle 200. The system controller 101 can receive, from the wheel speed sensors 116, speed data associated with the vehicle 200. The system controller 101 can then estimate the current location of the vehicle 200 based on a dead reckoning process performed by calculating latitude and longitude coordinates and a heading X 232 based on the initial location of the vehicle from the GPS 120, the yaw rate, and the speed data.

The vehicle 200 can estimate a lateral position Y 230 within the lane 250 different from that of the actual position of the vehicle 200 due to inaccuracies/drift associated with the dead reckoning process. As described in more detail below, in order to increase the accuracy of detecting the actual lateral position of the vehicle 200 within the lane, the system controller 101 can process images detected by the image acquisition unit 125 (including image sensors 121, 122, and/or 126) to determine the lateral distance $Y_L$ 230a from the left lane marker 210a to the center of gravity 212 of the vehicle (or the left side of the vehicle) and a lateral distance Yr 230b from the right lane marker 210b to the center of gravity 212 of the vehicle (or the right side of the vehicle).

Figure 3:
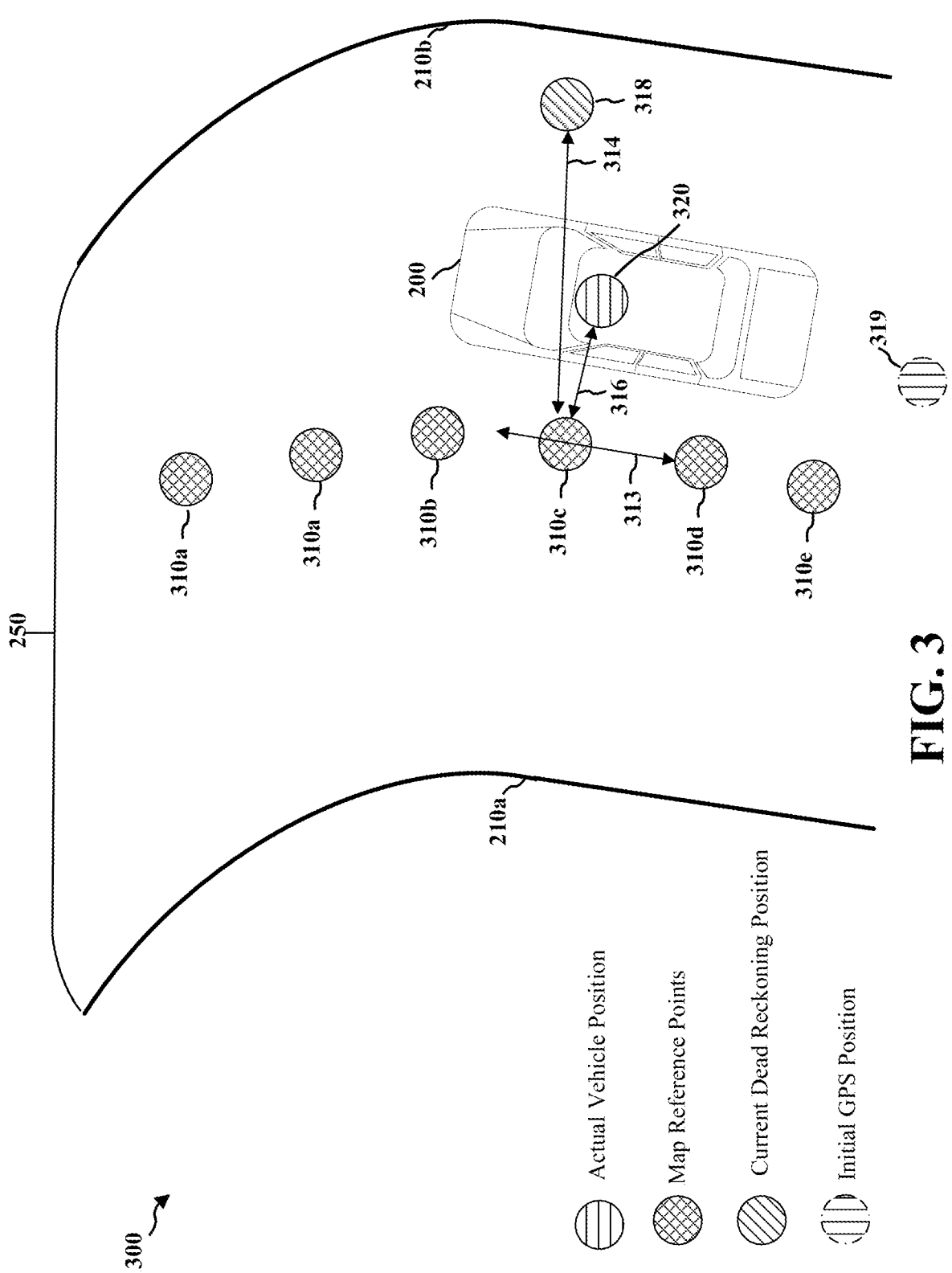
FIG. 3 illustrates a top view of a lateral position of a vehicle within a curved lane according to some embodiments of the disclosure.

FIG. 3 illustrates a top view 300 of a position of a vehicle 200 within a curved lane 250 according to some embodiments of the disclosure. FIG. 3 shows vehicle 200 traveling in lane 250. In some aspects, the system controller 101 can receive a GPS location of the vehicle 200 at initial location 319. The system controller 101 can lose the GPS signal after initial location 319 and begin the dead reckoning process. Location 319 may be considered an initial location in the dead reckoning process. The system controller 101 can begin estimating the location of the vehicle 200 using the dead reckoning process based on the initial location 319 of the vehicle 200, the yaw rate, and the speed data. For example, the system controller 101 can subsequently estimate the current location of the vehicle 200 to be at location 318. However, due to sensor drift and other inaccuracies such as inaccuracies in the initial location 319, the yaw rate, and the speed data, the vehicle 200 can actually be at location 320.

The system controller 101 can match the actual location 320 of the vehicle 200 to the map reference points 310 that represent the center 313 of the lane 250. The system controller 101 can determine the distance 316 between the actual location 320 of the vehicle 200 and the reference points 310 corresponding to the center of the lane based on data from the image sensors. For example, the image sensors can detect the distance $Y_R$ 230b from the right side of the vehicle 200 to the right lane marker 210b and the distance $Y_L$ 230a from the left side of the vehicle 200 to the left lane marker 210a to determine the actual location 320.

Before performing map matching, it is essential to ensure that the coordinates and projections utilized in the SD map and local point measurements match. This alignment is crucial for accurate execution of map matching. By precisely determining the vehicle's actual position 320 and heading, local points can be effectively transformed between world coordinates and vehicle coordinates.

The SD map comprises line segments that represent lane and road markings. The primary objective of map matching is to achieve the optimal alignment of a point measurement with a specific line segment on the SD map.

Drawing from the information embedded within the 2D map, a localized search map is generated for a designated area. This localized map is characterized by a customizable size and utilizes timestamp-based sliding windows to define the scope of map matching. The distances are calculated using a Euclidean distance (the length of a line segment between the two points). The Euclidean distance 314 is computed between a location 318 obtained from the dead reckoning process and a corresponding point 310 on the SD map. Subsequently, the minimum distance is chosen as the best match through the application of an iterative closest point algorithm. In the example of FIG. 3 the map reference point 310c is determined to be the best match to the SD map.

Figure 4:
FIG. 4 illustrates a top view of a position of a vehicle within a curved lane according to some embodiments of the disclosure.

FIG. 4 illustrates a top view 400 of a position of a vehicle 200 within a curved lane 250 according to some embodiments of the disclosure.

The system controller 101 can include a lane detection module designed to provide position, type, and color information about the lane markings 210 on the road using the image sensors. The lane detection module detects lane 250 in the image plane, which is then projected to the ground plane via a homography transform. After obtaining the optimal pitch angle, a final homography transform is performed to project the lane pixels in the image plane to the ground plane. The homography matrix is written as follows in Equation (1):

$$h\begin{bmatrix} -\frac{1}{f_u}c_2 & \frac{1}{f_u}s_1s_2 & \frac{1}{f_u}c_uc_2 - \frac{1}{f_v}c_vs_1s_2 - c_1s_2 & 0 \\ \frac{1}{f_u}s_2 & \frac{1}{f_v}s_1c_1 & -\frac{1}{f_u}c_us_2 - \frac{1}{f_v}c_vs_1c_2 - c_1c_2 & 0 \\ 0 & \frac{1}{f_v}c_1 & -\frac{1}{f_v}c_vc_1 - s_1 & 0 \\ 0 & -\frac{1}{hf_v}c_1 & \frac{1}{hf_v}c_vc_1 - \frac{1}{h}s_1 & 0 \end{bmatrix} \quad (1)$$

After extracting the pixels that belong to right lane marker 210b and left lane marker 210a from the camera image, a polynomial can be fitted to those pixel positions to approximate lane boundaries in a mathematical form. In some aspects, a 2nd or 3rd order polynomial are adopted for this curvature approximation Based on those polynomials, the radius of curvature of the lane 250 can be computed. The equation f(y)=Ay2+By+C represents the general form of a $2^{nd}$ order polynomial that approximates a curved lane line in a broader sense, where A, B, and C are the coefficients to be found by fitting the polynomial to the extracted lane-line pixel positions. For example, left lane 210a can be represented by $f_{left}(y)=A_{left}y^2+B_{left}y+C_{left}$ and right lane marker 210b can be represented by $f_{right}(y)=A_{right}y^2+B_{right}y+C_{right}$.

The radius of curvature 432 at any point x of the function x=f(y) is given by Equation (2):

$$R_{curve} = \frac{\left[1 + \left(\frac{dx}{dy}\right)^2\right]^{3/2}}{\left|\frac{d^2x}{dy^2}\right|} \quad (2)$$

In the case of the second order polynomial above, the first and second derivatives are given by Equations (3) and (4):

$$f'(y) = \frac{dz}{dy} = 2Ay + B \tag{3}$$

$$f''(y) = \frac{d^2z}{dy^2} = 2Ay \tag{4}$$

Therefore, the radius of curvature is given by Equation (5):

$$R_{curve} = \frac{\left(1 + (2Ay + B)^2\right)^{3/2}}{|2A|} \tag{5}$$

The system controller 101 can use the image sensors to detect lane markers 210 on a road with a certain level of confidence, provide the distance $Y_L$ 230a and $Y_R$ 230b to the lane markers 210 with respect to the location of the image sensors on the vehicle 200, detect the radius of curvature 432, and the relative heading X 232 of the lane 250 with respect to the vehicle 200.

The desired relative heading of the vehicle 200 can be calculated based on the lateral deviation from the center of the lane 250. This is because if system controller 101 is used to control only the y-position of the vehicle 200, then at the center of the lane the system controller 101 will not steer the vehicle, regardless of the heading. This may result in oscillations that could increase causing the vehicle 200 to steer into the next lane, which is undesired. The desired heading X 232 at the center of the lane needs to be zero meaning the vehicle 200 is required to be oriented tangential to the lane 250. Therefore, the relative heading X 232 needs to be based on the lateral position. This is achieved by creating the relative heading X 232 as a function of the error in lateral position.

Figure 5:
FIG. 5 illustrates a method of determining a position of a vehicle within a curved lane based on dead reckoning according to some embodiments of the disclosure.

FIG. 5 illustrates a position of a vehicle within a curved lane based on dead reckoning according to some embodiments of the disclosure. In some aspects, when the GPS signal is lost or weak, the system controller 101 can estimate the current location of the vehicle 200 based on the dead reckoning process performed by calculating latitude and longitude coordinates and a heading X 232 based on the initial location of the vehicle at point 540a from the GPS 120, the yaw rate, and the speed data.

In some aspects, determining the speed data can include installing the wheel speed encoder and ensuring it is properly calibrated and aligned with a rotating part of the wheel, collecting data from the encoder, including the number of pulses (or counts) generated as the wheel rotates and the time intervals between pulse readings. Determining the wheel circumference can include measuring the wheel's circumference, which is the distance the vehicle travels with one complete revolution of the wheel. Calculating the instantaneous speed can include for each time interval between pulse readings, calculating the instantaneous speed of the vehicle using the formula: instantaneous speed=distance/time interval. This speed represents the average speed during that time interval, considering acceleration or deceleration. To account for acceleration and deceleration, since speed is changing due to acceleration or deceleration, the changing speed needs to be considered within each time interval. For example, calculating the average speed during each time interval includes adding the initial speed (at the beginning of the interval) and the final speed (at the end of the interval), and then dividing by 2. Using the calculated average speed for each time interval, the distance traveled during that time interval can be computed using the formula: distance=average speed×time interval. To obtain the total travel distance, the distances calculated for each time interval is summed up. The process is repeated for each time interval between pulse readings to capture changes in speed and accurately calculate the travel distance. By considering the changing speed due to acceleration or deceleration, the varying velocity of the vehicle 200 at different points 540 in time are considered. This method provides a more accurate estimation of travel distance when the vehicle 200 is not moving at a constant speed.

Referring to FIG. 5, at the point 540a (X0, Y0 indicating the initial location), the vehicle 200 sensors system (e.g., IMU 118, wheel speed sensors 116) will provide the vehicle 200 speed v(n) and curvature of vehicle α(n) at time interval period n. The sensor system can continue to provide speed v(n) and curvature of vehicle α(n) at time interval period n when the GPS signal is lost or weak. Time interval period n can be a fixed time interval. In some embodiments, each time period t(n) is short enough so that the vehicle trajectory can be divided over a short distance (e.g., each segment 545), and a linear model and integral solution can be used to calculate vehicle geometry information to create accurate road/lane information. For example, the longitude distance (Dx) traveled can be represented by Equation (6) and the latitude distance (Dy) traveled can be represented by Equation (7).

$$D_x = \sum v(t)t(n)\cos a(n) + X0 \tag{6}$$

$$D_y = \sum v(t)t(n)\sin a(n) + Y0 \tag{7}$$

In all scenarios, there will be an increase in the accuracy ratio for both longitude and latitude. This improvement is particularly pronounced in curved lanes and areas where lane markers 210 are missing from segments of the road.

In some aspects, if the vehicle 200 is not in the center lane, Equations (8)-(11) below can be used to get the center lane info.

$$Xlm\_d(n) = lm\_d(n)\cos\alpha(n) - X(n) \tag{8}$$

$$Xli\_d(n) = li\_d(n)\cos\alpha(n) + X(n) \tag{9}$$

$$Ylm\_d(n) = lm\_d(n)\sin\alpha(n) + Y(n) \tag{10}$$

$$Yli\_d(n) = li\_d(n)\sin\alpha(n) - Y(n) \tag{11}$$

Figure 6:
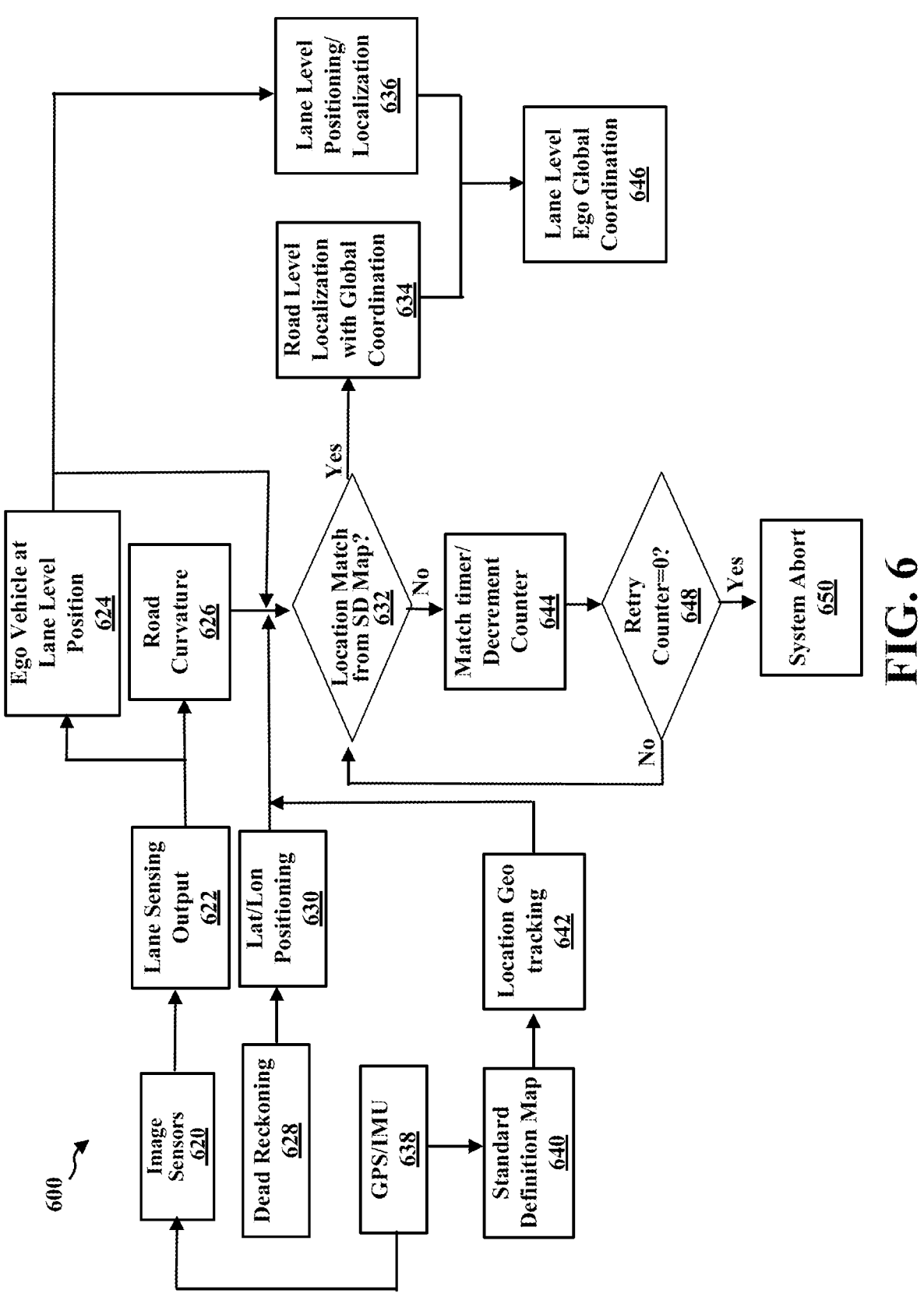
FIG. 6 is a flowchart of a method for determining lane level localization of the vehicle with global coordinates according to some embodiments of the disclosure.

FIG. 6 is a flowchart 600 for determining lane level localization of a vehicle with global coordinates according to some embodiments of the disclosure. The vehicle can store a database comprising standard-definition map data 640 corresponding to road level latitude and longitude coordinates for a plurality of roadway features. The vehicle can include an image sensor module 620 that provides image data to a lane sensing output module 622. The vehicle can include a processor in communication with the vehicle's navigation system, the database, and the image sensor module 620. The processor can be configured to determine an initial location of the vehicle based on GPS data from the GPS/IMU module 638. The processor can estimate a current location of the vehicle based on a dead reckoning process using the dead reckoning module 628 and the Lat/Lon positioning module 630 as described with reference to FIG.

5 when the GPS signal is lost or is weak. Additionally or alternatively, the process can receive, from a wireless transceiver, a location of the vehicle based on a terrestrial positioning service using wireless signal triangulation.

The lane level position module 624 can detect, based on data from the lane sensing output module 622, a lateral position of the vehicle in the lane as described with reference to FIG. 2. The road curvature module 626 can detect, based on the data from the lane sensing output module 622, the road curvature as described with reference to FIG. 4. The processor can update the current location of the vehicle based on the lateral position of the vehicle in the lane, the road curvature, and an updated current location of the vehicle based on the dead reckoning process. At map match module 632, the processor can try to match the position of the vehicle with a position on the SD map. For example, the processor can try to match the updated current location of the vehicle with the SD map data based on a minimum Euclidean distance between the updated current location and a location indicated in the SD map data. The processor can try to match the updated current location of the vehicle with the SD map a number of times. The processor can try to match the SD map based on data from the lane level position module 624, the road curvature module 626, the lat/lon positioning module 630 and the geo tracking module 642. If the processor fails to get a match, a timer 644 can be started and the processor can decrement a retry counter 648 and try to get a match again after the timer 644 expires. If the map matching fails after a number of retries (the retry counter 648=0), the navigation system can abort 650 and an error message (e.g., lost vehicle position) can be displayed to the vehicle driver on the navigation system display. If the map matching succeeds, the navigation system can display an updated position of the vehicle on the navigation display.

In some embodiments, the processor can match the position of the vehicle with the SD map based on a variance estimation. The processor can determine a road level localization of the vehicle with global coordinates 634 based on the match. The processor can determine a lane level localization based on the updated current location of the vehicle and the lane level position 624. In some aspects, the processor can combine the road level localization 634 with the lane level localization 636 to produce a lane level localization of the vehicle with global coordinates 646. In some aspects, the processor is further configured to generate a high-definition lane level road map based on combining the lane level localization 636 with the road level localization with global coordinates 634. The processor can be further configured to transmit a command to a steering control system of the vehicle to correct a heading of the vehicle based on the updated current location of the vehicle.

Figure 7:
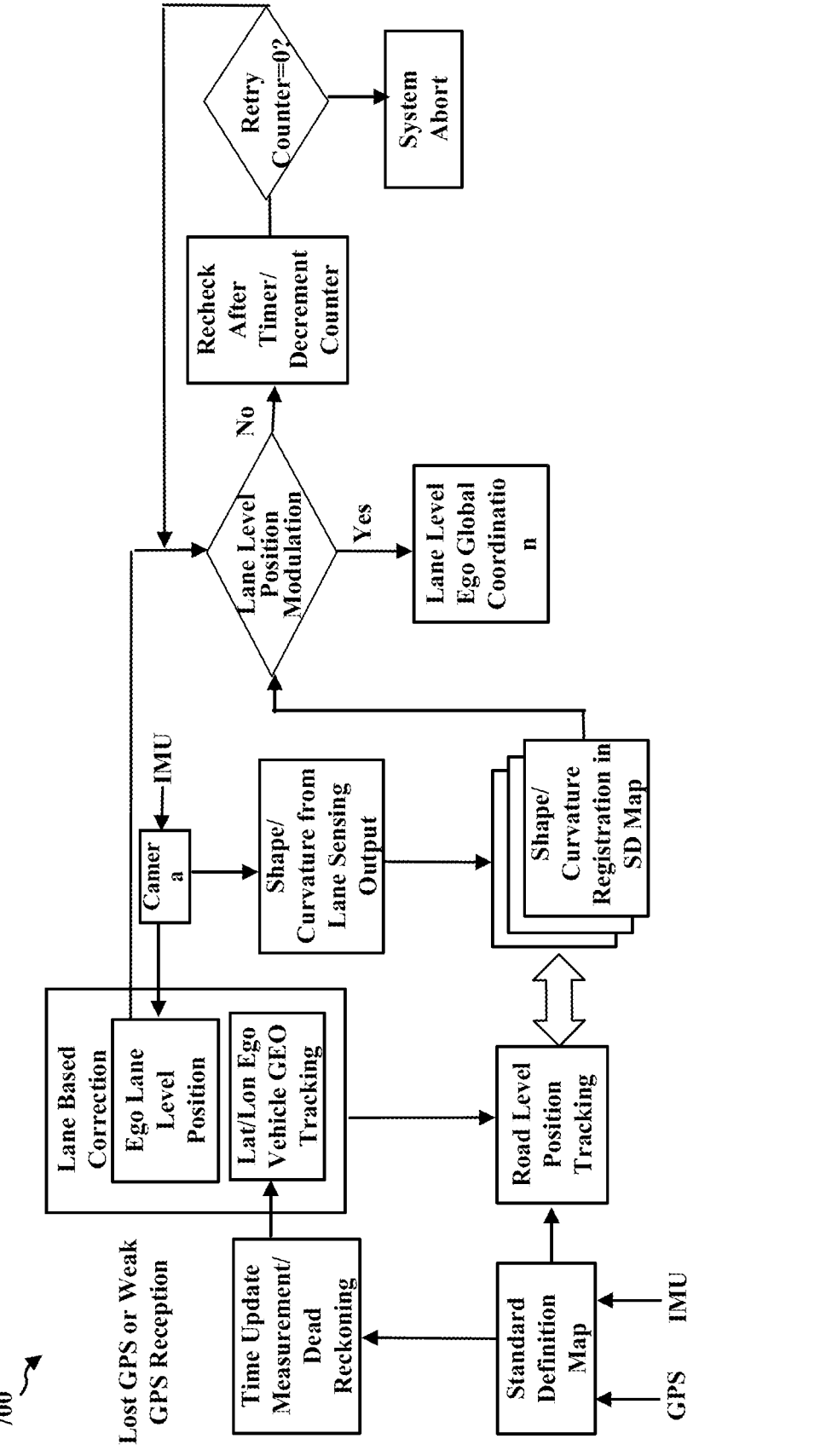
FIG. 7 is a flowchart of a method for map matching and determining lane level localization of the vehicle with global coordinates according to some embodiments of the disclosure.

FIG. 7 is a flowchart 700 of a method for determining lane level localization of the vehicle with global coordinates according to some embodiments of the disclosure. In the scenario of lost or weak GPS, the real-time camera output provides ego vehicle lane-level localization with vehicle coordinates. The dead reckoning module would be initiated while the ego vehicle operates with lost or weak GPS signal and a rough road level position will be produced. Next, a road level map matching is performed with shape/curvature registration in the SD map. Using a match variance estimation, a unique location in the SD map will be produced by matching road level position tracking and shape/registration in the SD map, then using the same method as in normal GPS operation mode, lane level position modulation is performed.

FIG. 8 is a flowchart 800 of a method for determining lane level localization of the vehicle with global coordinates. With reference to FIGS. 1-7, the method can be performed by one or more system controllers 101. In some embodiments, the method can include storing a database comprising standard-definition map data corresponding to road level latitude and longitude coordinates for a plurality of roadway features. For example, referring to FIG. 1, the method can include storing a database comprising standard-definition map data corresponding to road level latitude and longitude coordinates for a plurality of roadway features in map database 160.

In some embodiments, the method can include determining 810 an initial location of the vehicle. For example, referring to FIGS. 3 and 5, the method can include determining an initial location of the vehicle based on GPS signals.

In some embodiments, the method can include estimating 820 a current location of the vehicle based on a dead reckoning process. For example, referring to FIG. 5, the method can include estimating a current location of the vehicle based on receiving, from an inertial measurement unit (IMU), a yaw rate associated with the vehicle, receiving, from one or more wheel speed sensors, speed data associated with the vehicle, and estimating the current location of the vehicle further based on the dead reckoning process performed by calculating latitude and longitude coordinates and a heading based on the initial location of the vehicle, the yaw rate, and the speed data.

In some embodiments, the method can include detecting 830, based on image data from at least one image sensor, a lateral position of the vehicle within a lane of the road. For example, referring to FIGS. 2 and 3, the method can include receiving image data in the image plane from one or more image sensors, projecting the image to the ground plane via a homography transform, and determining lateral distances to the lane markers.

In some embodiments, the method can include updating 840 the current location of the vehicle based on a difference between the estimated current location and the lateral position of the vehicle within the lane. For example, referring to FIG. 3, the method can include updating the current location of the vehicle based on a difference between the estimated current location and the lateral position of the vehicle within the lane.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore, the disclosures and descriptions herein are intended to be illustrative, but not limiting, of the scope of the invention.

Portions of what was described above may be implemented with logic circuitry such as a dedicated logic circuit or with a microcontroller or other form of processing core that executes program code instructions. Thus, processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

For example, the previously described embodiment operations may be stored as instructions on a non-transitory computer readable medium for execution by a controller, processor, computer, etc. The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMS, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "selecting," "determining," "receiving," "forming," "grouping," "aggregating," "generating," "removing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

The following examples are illustrative only and may be combined with other examples or teachings described herein, without limitation.

Example 1 is an automotive vehicle, comprising a vehicle navigation system, a database comprising standard-definition map data corresponding to road level latitude and longitude coordinates for a plurality of roadway features, at least one image sensor, and a processor in communication with the vehicle navigation system, the database, and the at least one image sensor, the processor configured to determine an initial location of the vehicle, estimate a current location of the vehicle based on a dead reckoning process, detect, based on image data from the at least one image sensor, a lateral position of the vehicle within a lane of a road, and update the current location of the vehicle based on a difference between the estimated current location and the lateral position of the vehicle within the lane.

Example 2 may be combined with Example 1 and includes the processor is further configured to determine the initial location of the vehicle based on a global navigation satellite system (GNSS) signal.

Example 3 may be combined with any of Examples 1-2 and further includes the processor is further configured to estimate the current location of the vehicle in an absence of the GNSS signal or in a presence of a weak GNSS signal.

Example 4 may be combined with any of Examples 1-3 and further includes the processor is further configured to match the updated current location of the vehicle with the standard-definition map data based on a minimum Euclidean distance between the updated current location and a location indicated in the standard-definition map data.

Example 5 may be combined with any of Examples 1-4 and further includes the processor is further configured to: detect, based on image data from the at least one image sensor, a curvature of the lane; match the updated current location of the vehicle with the standard-definition map data further based on the detected curvature of the lane; determine a road level localization with global coordinates based on the matching; determine a lane level localization based on the updated current location of the vehicle; and combine the road level localization with the lane level localization to produce a lane level localization of the vehicle with global coordinates.

Example 6 may be combined with any of Examples 1-5 and further includes the processor is further configured to generate a high-definition road map based on the lane level localization with global coordinates.

Example 7 may be combined with any of Examples 1-6 and further includes the processor is further configured to detect the curvature of the lane further based on a homography transform of the image data and a polynomial curve fitting function.

Example 8 may be combined with any of Examples 1-7 and further includes an inertial measurement unit (IMU) and one or more wheel speed sensors, wherein the processor is further configured to: receive, from the IMU, a yaw rate associated with the vehicle; receive, from the one or more wheel speed sensors, speed data associated with the vehicle; and estimate the current location of the vehicle further based on the dead reckoning process performed by calculating latitude and longitude coordinates and a heading based on the initial location of the vehicle, the yaw rate, and the speed data.

Example 9 may be combined with any of Examples 1-8 and further includes a wireless transceiver, wherein the processor is further configured to: receive, from the wireless transceiver, a location of the wireless transceiver based on a terrestrial positioning service using wireless signal triangulation; and estimate the current location of the vehicle further based on the location of the wireless transceiver.

Example 10 may be combined with any of Examples 1-9 and further includes the at least one image sensor comprises a lane-sensing camera and the road comprises at least one of a freeway, a highway, an urban street, or a rural street.

Example 11 may be combined with any of Examples 1-10 and further includes the processor is further configured to output, to a display of the vehicle navigation system, an indication of the current location of the vehicle along the road.

Example 12 may be combined with any of Examples 1-11 and further includes the processor is further configured to transmit, to a steering control system of the vehicle, a command to correct a heading of the vehicle based on the updated current location of the vehicle.

Example 13 may be combined with any of Examples 1-12 and further includes the standard-definition map data comprises a Society of Automotive Engineers (SAE) advanced driver-assistance systems (ADAS) level two map.

Example 14 is a method for updating a location of a vehicle navigating a road, the method comprising storing a database comprising standard-definition map data corresponding to road level latitude and longitude coordinates for a plurality of roadway features; determining an initial location of the vehicle; estimating a current location of the vehicle based on a dead reckoning process; detecting, based on image data from at least one image sensor, a lateral position of the vehicle within a lane of the road; and updating the current location of the vehicle based on a difference between the estimated current location and the lateral position of the vehicle within the lane.

Example 15 may be combined with Example 14 and includes the determining the initial location of the vehicle comprises determining the initial location of the vehicle based on a global navigation satellite system (GNSS) signal.

Example 16 may be combined with any of Examples 14-15 and further includes the estimating the current location of the vehicle comprises estimating the current location of the vehicle in an absence of the GNSS signal or in a presence of a weak GNSS signal.

Example 17 may be combined with any of Examples 14-16 and further includes matching the updated current location of the vehicle with the standard-definition map data based on a minimum Euclidean distance between the updated current location and a location indicated in the standard-definition map data.

Example 18 may be combined with any of Examples 14-17 and further includes detecting, based on image data from the at least one image sensor, a curvature of the lane; matching the updated current location of the vehicle with the standard-definition map data further based on the detected curvature of the lane; determining a road level localization with global coordinates based on the matching; determining a lane level localization based on the updated current location of the vehicle; and combining the road level localization with the lane level localization to produce a lane level localization of the vehicle with global coordinates.

Example 19 may be combined with any of Examples 14-18 and further includes comprising generating a high-definition road map based on the lane level localization with global coordinates.

Example 20 may be combined with any of Examples 14-19 and further includes the detecting the curvature of the lane comprises detecting the curvature of the lane based on a homography transform of the image data and a polynomial curve fitting function.

Example 21 may be combined with any of Examples 14-20 and further includes receiving, from an inertial measurement unit (IMU), a yaw rate associated with the vehicle; and receiving, from one or more wheel speed sensors, speed data associated with the vehicle, wherein the estimating the current location of the vehicle comprises estimating the current location of the vehicle further based on the dead reckoning process performed by calculating latitude and longitude coordinates and a heading based on the initial location of the vehicle, the yaw rate, and the speed data.

Example 22 may be combined with any of Examples 14-21 and further includes receiving, from a wireless transceiver, a location of the wireless transceiver based on a terrestrial positioning service using wireless signal triangulation, wherein the estimating the current location of the vehicle comprises estimating the current location of the vehicle further based on the location of the wireless transceiver.

Example 23 may be combined with any of Examples 14-22 and further includes the at least one image sensor comprises a lane-sensing camera and the road comprises at least one of a freeway, a highway, an urban street, or a rural street.

Example 24 may be combined with any of Examples 14-23 and further includes outputting, to a display of a navigation system, an indication of the current location of the vehicle along the road.

Example 25 may be combined with any of Examples 14-24 and further includes entering a low power mode during the inactive paging occasion; and refraining from transmitting paging information in the inactive paging occasion.

Example 26 may be combined with any of Examples 14-25 and further includes the standard-definition map data comprises a Society of Automotive Engineers (SAE) advanced driver-assistance systems (ADAS) level two map.

Example 27 is a non-transitory, computer-readable medium storing instructions that, when executed by at least one processor, cause the processor to: store a database comprising standard-definition map data corresponding to road level latitude and longitude coordinates for a plurality of roadway features; determine an initial location of a vehicle; estimate a current location of the vehicle based on a dead reckoning process; detect, based on image data from at least one image sensor, a lateral position of the vehicle within a lane of a road; and update the current location of the vehicle based on a difference between the estimated current location and the lateral position of the vehicle within the lane.

Example 28 may be combined with Examples 27 and further includes storing instructions that cause the processor to: determine the initial location of the vehicle based on a global navigation satellite system (GNSS) signal; and estimate the current location of the vehicle in an absence of the GNSS signal or in a presence of a weak GNSS signal.

Example 29 may be combined with any of Examples 27-28 and further includes storing instructions that cause the processor to: detect, based on image data from the at least one image sensor, a curvature of the lane; match the updated current location of the vehicle with the standard-definition map data further based on the detected curvature of the lane; determine a road level localization with global coordinates based on the matching; determine a lane level localization based on the updated current location of the vehicle; and combine the road level localization with the lane level localization to produce a lane level localization with global coordinates Example 30 is an apparatus including means for implementing a method as in any of Examples 1-29.

What is claimed is:

1. An automotive vehicle, comprising:
a vehicle navigation system;
a database comprising standard-definition map data comprising road level latitude and longitude coordinates for a plurality of roadway features;
at least one image sensor; and
a processor in communication with the vehicle navigation system, the database, and the at least one image sensor, the processor configured to:
determine an initial location of the vehicle;
estimate a current location of the vehicle based on a dead reckoning process;
detect, based on image data from the at least one image sensor, a lateral position of the vehicle within a lane of a road;
update the current location of the vehicle based on a difference between the estimated current location and the lateral position of the vehicle within the lane;
detect, based on the image data from the at least one image sensor, a roadway feature of the plurality of roadway features; and
match the updated current location of the vehicle with the standard-definition map data based on a distance between the updated current location and the detected roadway feature and corresponding road level latitude and longitude coordinates for the detected roadway feature.

2. The automotive vehicle of claim 1, wherein the processor is further configured to determine the initial location of the vehicle based on a global navigation satellite system (GNSS) signal.

3. The automotive vehicle of claim 2, wherein the processor is further configured to estimate the current location of the vehicle in an absence of the GNSS signal or in a presence of a weak GNSS signal.

4. The automotive vehicle of claim 1, wherein to match the updated current location of the vehicle with the standard-definition map data based on the distance between the updated current location and the detected roadway feature is based on a minimum Euclidean distance between the updated current location and a location of the detected roadway feature indicated in the standard-definition map data.

5. The automotive vehicle of claim 4, wherein the processor is further configured to:
detect, based on the image data from the at least one image sensor, a curvature of the lane;
match the updated current location of the vehicle with the standard-definition map data further based on the detected curvature of the lane;
determine a road level localization with global coordinates based on the matching;
determine a lane level localization based on the updated current location of the vehicle; and
combine the road level localization with the lane level localization to produce a lane level localization of the vehicle with global coordinates.

6. The automotive vehicle of claim 5, wherein the processor is further configured to generate a high-definition road map based on the lane level localization with global coordinates.

7. The automotive vehicle of claim 5, wherein the processor is further configured to detect the curvature of the lane further based on a homography transform of the image data and a polynomial curve fitting function.

8. The automotive vehicle of claim 1, further comprising an inertial measurement unit (IMU) and one or more wheel speed sensors, wherein the processor is further configured to:
receive, from the IMU, a yaw rate associated with the vehicle;
receive, from the one or more wheel speed sensors, speed data associated with the vehicle; and
estimate the current location of the vehicle further based on the dead reckoning process performed by calculating latitude and longitude coordinates and a heading based on the initial location of the vehicle, the yaw rate, and the speed data.

9. The automotive vehicle of claim 1, further comprising a wireless transceiver, wherein the processor is further configured to:
receive, from the wireless transceiver, a location of the wireless transceiver based on a terrestrial positioning service using wireless signal triangulation; and
estimate the current location of the vehicle further based on the location of the wireless transceiver.

10. The automotive vehicle of claim 1, wherein the at least one image sensor comprises a lane-sensing camera and the road comprises at least one of a freeway, a highway, an urban street, or a rural street.

11. The automotive vehicle of claim 1, wherein the processor is further configured to output, to a display of the vehicle navigation system, an indication of the current location of the vehicle along the road.

12. The automotive vehicle of claim 1, wherein the processor is further configured to transmit, to a steering control system of the vehicle, a command to correct a heading of the vehicle based on the updated current location of the vehicle.

13. The automotive vehicle of claim 1, wherein the standard-definition map data comprises a Society of Automotive Engineers (SAE) advanced driver-assistance systems (ADAS) level two map.

14. A method for updating a location of a vehicle navigating a road, the method comprising:

storing a database comprising standard-definition map data corresponding to road level latitude and longitude coordinates for a plurality of roadway features;

determining an initial location of the vehicle;

estimating a current location of the vehicle based on a dead reckoning process;

detecting, based on image data from at least one image sensor, a lateral position of the vehicle within a lane of the road;

updating the current location of the vehicle based on a difference between the estimated current location and the lateral position of the vehicle within the lane;

matching the updated current location of the vehicle with the standard-definition map data based on a minimum Euclidean distance between the updated current location and a location indicated in the standard-definition map data;

detecting, based on the image data from the at least one image sensor, a curvature of the lane;

matching the updated current location of the vehicle with the standard-definition map data further based on the detected curvature of the lane;

determining a road level localization with global coordinates based on the matching;

determining a lane level localization based on the updated current location of the vehicle; and combining the road level localization with the lane level localization to produce a lane level localization of the vehicle with global coordinates.

15. The method of claim 14, wherein the determining the initial location of the vehicle comprises determining the initial location of the vehicle based on a global navigation satellite system (GNSS) signal.

16. The method of claim 15, wherein the estimating the current location of the vehicle comprises estimating the current location of the vehicle in an absence of the GNSS signal or in a presence of a weak GNSS signal.

17. The method of claim 14, further comprising generating a high-definition road map based on the lane level localization with global coordinates.

18. The method of claim 14, wherein the detecting the curvature of the lane comprises detecting the curvature of the lane based on a homography transform of the image data and a polynomial curve fitting function.

19. The method of claim 14, further comprising:

receiving, from an inertial measurement unit (IMU), a yaw rate associated with the vehicle; and receiving, from one or more wheel speed sensors, speed data associated with the vehicle, wherein the estimating the current location of the vehicle comprises estimating the current location of the vehicle further based on the dead reckoning process performed by calculating latitude and longitude coordinates and a heading based on the initial location of the vehicle, the yaw rate, and the speed data.

20. The method of claim 14, further comprising:

receiving, from a wireless transceiver, a location of the wireless transceiver based on a terrestrial positioning service using wireless signal triangulation, wherein the estimating the current location of the vehicle comprises estimating the current location of the vehicle further based on the location of the wireless transceiver.

21. The method of claim 14, wherein the at least one image sensor comprises a lane-sensing camera and the road comprises at least one of a freeway, a highway, an urban street, or a rural street.

22. The method of claim 14, further comprising outputting, to a display of a navigation system, an indication of the current location of the vehicle along the road.

23. The method of claim 14, further comprising transmitting, to a steering control system of the vehicle, a command to correct a heading of the vehicle based on the updated current location of the vehicle.

24. The method of claim 14, wherein the standard-definition map data comprises a Society of Automotive Engineers (SAE) advanced driver-assistance systems (ADAS) level two map.

25. A non-transitory, computer-readable medium storing instructions that, when executed by at least one processor, cause the processor to:

store a database comprising standard-definition map data corresponding to road level latitude and longitude coordinates for a plurality of roadway features;

determine an initial location of a vehicle;

estimate a current location of the vehicle based on a dead reckoning process;

detect, based on the image data from at least one image sensor, a lateral position of the vehicle within a lane of a road;

update the current location of the vehicle based on a difference between the estimated current location and the lateral position of the vehicle within the lane;

match the updated current location of the vehicle with the standard-definition map data based on a minimum Euclidean distance between the updated current location and a location indicated in the standard-definition map data;

detect, based on image data from the at least one image sensor, a curvature of the lane;

match the updated current location of the vehicle with the standard-definition map data further based on the detected curvature of the lane;

determine a road level localization with global coordinates based on the matching;

determine a lane level localization based on the updated current location of the vehicle; and combine the road level localization with the lane level localization to produce a lane level localization of the vehicle with global coordinates.

26. The non-transitory, computer-readable medium of claim 25, further storing instructions that cause the processor to:

determine the initial location of the vehicle based on a global navigation satellite system (GNSS) signal; and estimate the current location of the vehicle in an absence of the GNSS signal or in a presence of a weak GNSS signal.

*     *     *     *     *